United States Patent [19]

Bruton et al.

[11] 4,421,134

[45] Dec. 20, 1983

[54] HEAT SENSITIVE GATE VALVE

[75] Inventors: Billy R. Bruton; David E. Snyder, both of Longview, Tex.

[73] Assignee: Axelson, Inc., Longview, Tex.

[21] Appl. No.: 416,686

[22] Filed: Sep. 10, 1982

[51] Int. Cl.³ .............................................. F16K 13/04
[52] U.S. Cl. ........................................ 137/72; 137/73; 137/77
[58] Field of Search .................... 137/72, 74, 75, 73, 137/77; 251/14

[56] References Cited

U.S. PATENT DOCUMENTS 2,028,149  1/1936  Goldsmith ............................ 137/77
2,817,349  12/1957  Seaver .................................. 137/75

Primary Examiner—Harold W. Weakley

[57] ABSTRACT

A manually operated gate valve having a fusible element located exterior of the shaft sealing element. Melting of the fusible element permitting outward movement of the shaft and gate elements with all the movable elements being confined to the housing.

8 Claims, 5 Drawing Figures

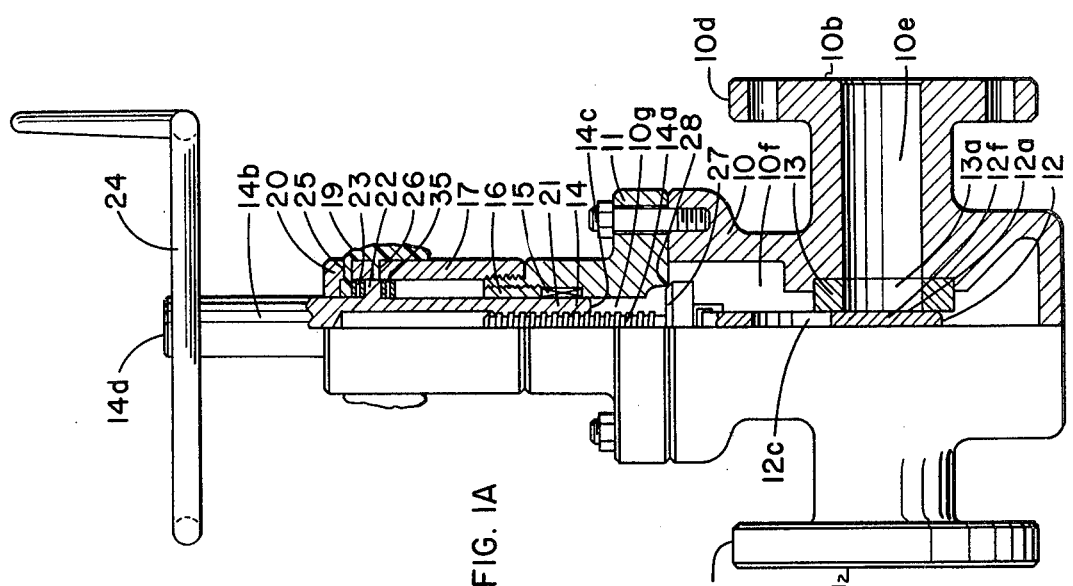
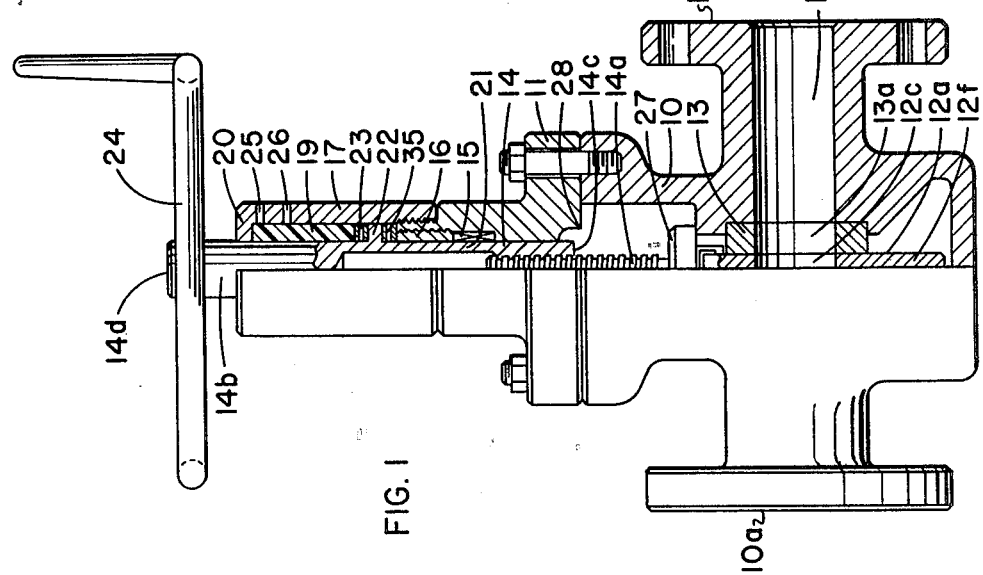

HEAT SENSITIVE GATE VALVE

This invention relates to a gate valve which in normal operation can be moved between open and closed positions but which, when exposed to a selected high temperature level, will automatically be moved to a selected one of open or closed positions.

In many instances, it would be desirable to utilize a gate valve which, under normal circumstances, could be readily opened and closed to perform its normal valving function, but upon exposure of such valve to excessively high temperatures, such as in a fire, the valve would actuate fully to a selected one of its open or closed positions. For example, such a valve could be used in refineries, chemical plants and the like as well as in christmas trees and flow lines in producing oil and gas wells to be automatically closed in the event of fire as a safety precaution and to prevent the fluid normally flowing through such valves from further feeding the fire. Such heat sensitive valves would thus "fail" to closed position. On the other hand, there may be instances where it would be desired for the valve to "fail" to open position in the event of fire. For example, it might be desirable to vent fluid to a flare in the event of a fire. As indicated, with either type of valve, it would be desirable to be able to utilize the valve as a normal valve during day-to-day operations in the sense that the valve could be readily opened and closed at will.

Many valves have been proposed which contain a fusible element which will cause some sort of response when exposed to a temperature sufficient to cause the element to fuse or melt. In one such type of valve, the fusible element continuously maintains the valve in either open or closed position until exposed to the elevated temperature at which time the valve will move to its other position. This type of valve cannot be normally operated between open and closed positions but remains in one position until exposed to the elevated temperature. Another type of valve is a globe valve wherein a fusible element is employed in such a manner that the valve can normally be moved between open and closed positions. This type of valve is illustrated in U.S. Pat. No. 3,618,627 to Wagner. In the Wagner valve, the fusible element (as shown in the Wagner patent) is located in the interior of the valve and the stem packing is located outwardly of the fusible element. As a result, a fire will tend to destroy the packing before the fusible element melts so that the valve will leak around the stem and feed the fire when the valve is in a flammable fluid service.

A very significant problem encountered in designing valves having the desired characteristics mentioned above is to provide a fail safe operation which does not involve a portion of the valve becoming a "projectile" when the fusible element melts. Illustrative of this problem is the valve shown in U.S. Pat. No. 3,842,854 to Wicke. In the Wicke patent, a valve operator is shown which becomes disengaged from the valve upon melting of a fusible member. When such a valve is used in reasonably high pressure operations (e.g., 5000 psi), line pressure acting across the main valve stem will cause it to move abruptly to closed valve position when the operator becomes disconnected. This movement is so abrupt and so forceful that it causes the operator to become a projectile in effect, so that it will travel several tens of feet before it comes to rest. Obviously, this can be extremely hazardous.

To further illustrate the forces involved when high line pressures act to move a gate valve to closed position without any restraint on such movement, it has been observed that these forces can actually cause the valve bonnet to be torn from the main valve body when the gate slams against the bonnet.

It is an object of this invention is to provide a gate valve which, upon being exposed to excessive temperature, moves from one position to its other position (e.g., from fully open to fully closed) under the influence of line pressure without producing any pieces or mechanisms which could act as projectiles and present a hazard to nearby personnel and equipment.

Another object is to provide such a gate valve wherein the fusible element is exteriorly of the valving mechanism per se and of the shaft seal so that the fusible element melts before the fire can destroy the shaft seal and so that the element can be readily replaced.

Another object is to provide such a gate valve which is constructed so that after melting of the fusible element and movement of the valve to its fail safe position, it will be readily apparent to an observer that the valve is in such position.

Other objects, advantages and features of the invention will be apparent to one skilled in the art upon a consideration of the written specification, the claims and the attached drawings wherein:

FIG. 1 is a view, in half-section, of a non-rising stem type gate valve embodying this invention;

FIG. 1A is a view similar to FIG. 1 showing the valve in the actuated position following exposure to elevated temperatures;

Figure 2:
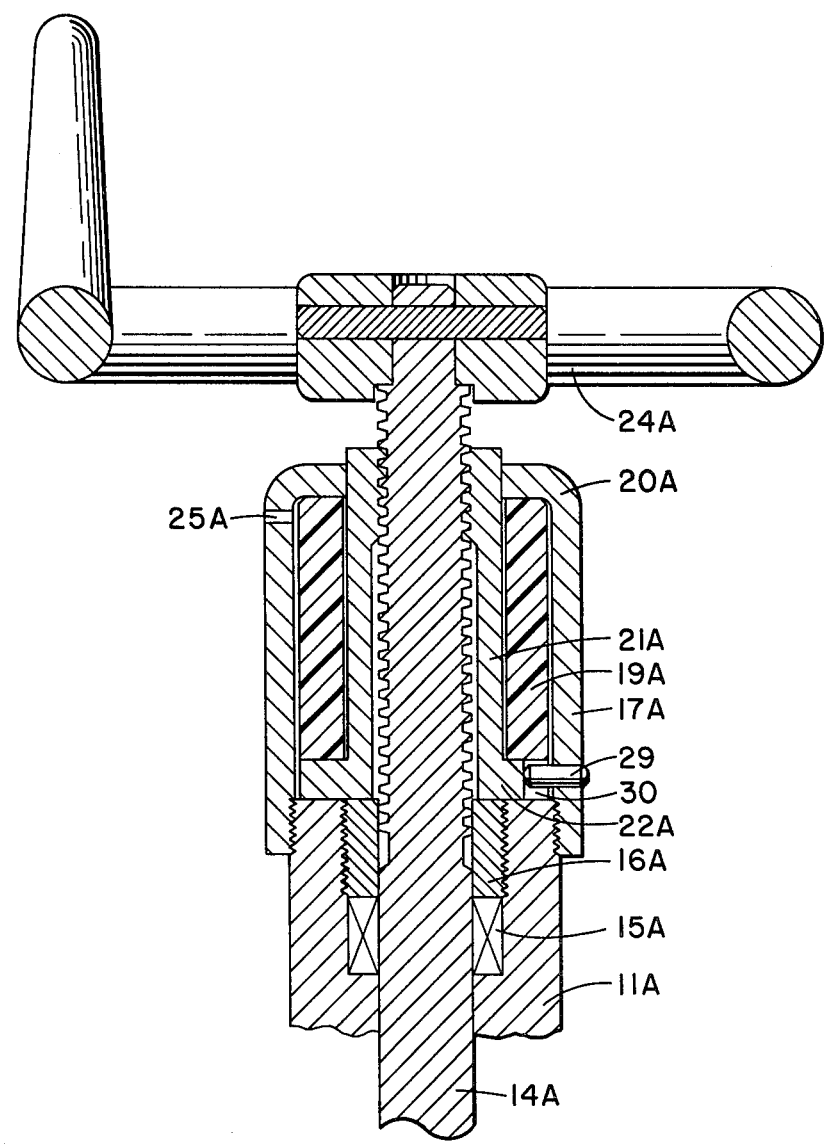
FIG. 2 is a partial cross-section of the upper portion of a gate valve showing another arrangement embodying this invention.

Referring to FIG. 1, there is shown a gate valve having a conventional body 10, bonnet 11, gate valve element 12, and seats 13 (only one of which is shown).

More particularly, the valve body has inlet and outlet ends 10a, 10b (which may be reversed) with means, such as flanges 10c and 10d, for connecting the valve to flow conduits (not shown). A flowway 10e extends through the valve body between its ends to conduct fluid flow through the valve. The valve body also has a chamber 10f intersecting the flowway 10e and opening to one side (upper) of the valve body. It will be noted that bonnet 11 is sealably connected to the valve body and has a bore 10g therethrough aligned with the chamber opening. It will also be recognized that the pair of seats 13 are annular and are spaced apart and oppose each other. Each seat has an opening 13a therethrough coaxial with the flowway 10e. Also, it will be seen that gate 12 has parallel outwardly facing seating surfaces 12a disposed between seats 13 at all times and reciprocal therebetween. The gate has an imperforate portion 12f positionable between the seats and across the flowway to prevent flow through the valve when the gate is moved to valve closed position. The gate also has a port 12c therethrough to be brought into alignment with the seats and flowway to permit flow through the valve as shown in FIG. 1.

Gate valve element 12 is connected to valve stem 14 which is illustrated in FIG. 1 as including a lower portion 14a and an upper portion 14b, the lower end of the latter being a nut 21 threaded to the upper end of the lower portion 14a.

An actuating means is provided to move gate valve element 12 between valve closing and valve open positions and this includes the valve stem 14 which extends through the bore of the bonnet to the exterior of the bonnet. In addition to the stem, the remainder of the actuating means can be functionally divided into three portions. In FIG. 1, the first portion is illustrated as cap 17 fixed to the valve bonnet 11. The second portion of the actuating means is shown as a hollow cylindrical fusible element 19 having its upper end bearing against an inturned shoulder 20 carried by cap 17. The third portion of the actuating means is illustrated as nut 21 threaded to lower portion 14a of valve stem 14 and having an outturned shoulder 22 carrying a bearing 23 which in turn engages the lower end of fusible element 19.

A conventional handwheel 24 can be connected to upper portion 14b of stem 14 to rotate nut 21 to cause reciprocation of lower portion 14a of valve stem 14 and valve element 12.

It will be seen that the valve stem 14 has an inner end 14c exposed to line pressure within the valve body and an outer end 14d exposed to atmospheric pressure exteriorly of the valve body such that a differential pressure effectively acts on the cross-sectional area of the stem within the seal means to provide the sole force to urge the stem outwardly of the valve body. Thus, the thrust forces developed by valve stem 14 are transmitted across fusible element 19 to the cap 17 and thence to the bonnet 11. These thrust forces will consist primarily of the force developed by the pressure within the valve body acting across an area equal to that of the valve stem 14 within seal means 15.

When fusible element 19 is heated sufficiently, as by a fire in the vicinity, it will melt or fuse and the force generated by internal valve pressure acting on the valve stem will cause the melted material to be displaced out of openings 25 and 26 in cap 17. As the material is so displaced, the valve stem and valve element will move upwardly a distance sufficient that tapered shoulder 27 on the valve stem will engage a shoulder 28 on a bonnet to stop such outward movement. These respective shoulders are, of course, located so that they will engage after the valve element 12 has been moved to valve closing position as shown in FIG. 1. The length of fusible element 19 should be at least equal to the distance the valve stem must travel to move the valve element from its fully open to its fully closed position. Also, the length of nut 21 below packing 15, when the valve is in its FIG. 1 position, is longer than the distance the nut moves outwardly upon melting of the fusible element to maintain engagement with seal 15.

As indicated above, high pressures within the valve body (e.g., 5000 psi) can act, if unrestrained, to cause the valve stem to slam violently against the bonnet. In accordance with one aspect of this invention, this is prevented by arranging the cap 17 so that it encloses the fusible member thereby preventing direct contact of the latter with a fire so that heat conducted through the cap to the fusible element is at a rate to cause a gradual melting of the fusible member at a controlled rate. Thus, the outward movement of the valve stem is dampened and the impact of shoulder 27 on the valve stem against shoulder 28 on the bonnet is of an acceptable magnitude.

Referring now to FIG. 2, the arrangement is similar to that shown in FIG. 1 except that the actuator is designed to accommodate a rotating rising stem type of valve as contrasted to the non-rising stem type of valve of FIG. 1. Elements in FIG. 2 corresponding to the elements of FIG. 1 have been numbered with like numbers with the suffix "A" being added.

In the actuating means of FIG. 2, the nut 21A does not rotate and is held against rotation by a pin 29 engaging a radial slot 30 in outturned shoulder 22A. Again, the thrust forces exerted by valve stem 14A are transmitted via nut 21A across fusible element 19A to cap 17A and thence to the bonnet 11A. Thus, the valve is susceptible of operation between open and closed positions by simply rotating handwheel 24A. However, when the fusible element 19A melts, the pressure internally of the valve will again force the valve stem upwardly to close the valve. Of course, fusible element 19A is made long enough so that when it is melted, the valve stem can move the valve element from its fully open to its fully closed position.

Figure 3A:
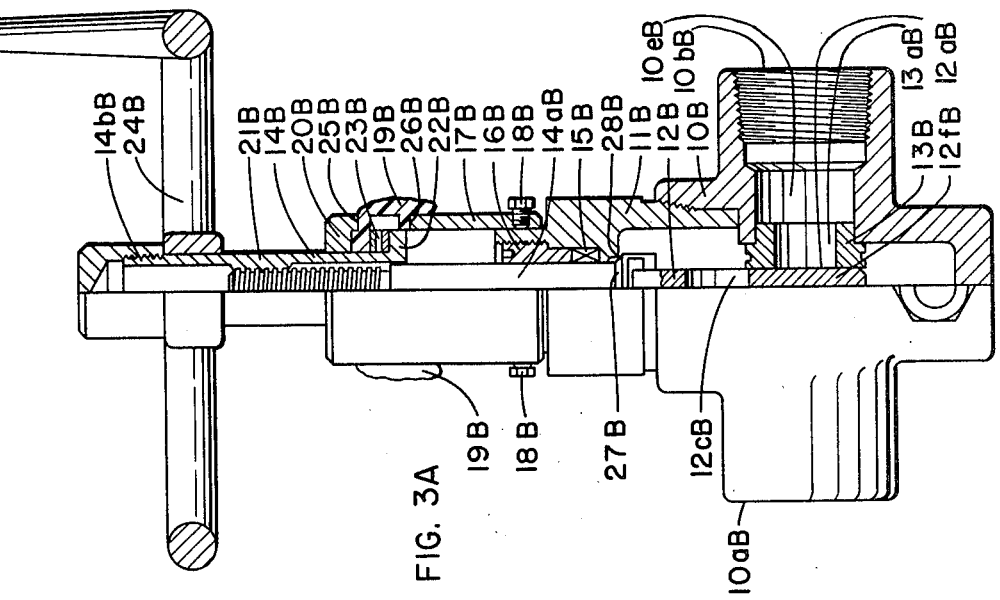
FIG. 3A is a view similar to FIG. 3 showing the valve in the actuated position following exposure to elevated temperatures.
Figure 3:
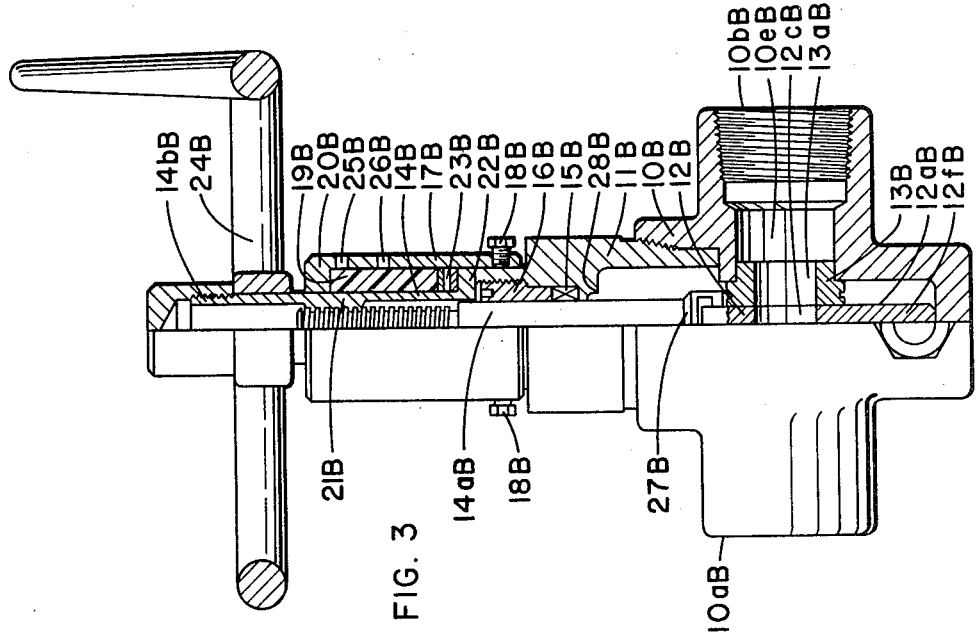
FIG. 3 is a view, in half section, showing the invention applied to a rising stem type of gate valve.

Referring now to FIG. 3, there is shown another arrangement of a valve similar to FIG. 1. Elements in FIG. 3 corresponding with elements of FIG. 1 have been numbered with like numbers with the suffix "B" being added. In this arrangement, valve stem 14B is sealed to the bonnet by seal 15B. The thrust forces of valve stem 14B are transmitted by nut 21B through bearing 23B to the fusible element 19B and thence via cap 17B to the bonnet 11B. Reciprocation of the valve stem 14B is had by rotating handwheel 24B which in turn rotates nut 21B. FIG. 3A shows that the operating principle of the actuating means of FIG. 3 is the same as that of the actuating means shown in FIG. 1 in that upon melting of the fusible element 19B, the nut and the valve stem are moved outwardly under the influence of pressure within the valve body as the fusible element 19B is melted.

In general, the fusible elements of this invention can be made from materials which have physical properties suitable for undergoing the stresses and strains inherent to the normal operation of the valve. In addition, such material should have a softening or melting point which will permit the valve to be closed when the temperature in the vicinity of the actuating mechanism reaches a level selected by the designer of the valve. Ordinarily this level will be temperature within the range of 300° to 400° F. for ambient service of the valve but can be higher or lower. An example of a preferred of one of such materials is an acetal resin marketed under the trade name Delrin. Other materials which can be used are nylon-6/6 marketed under the name Zytel, a polycarbonate marketed under the name Lexan, Noryl which is a modified polyelyphene oxide and Texin which is a polyurethane. Also, there are a family of lower melting point metal alloys which can be used including 30/70 bar solder, Woods metal, etc.

We claim:

1. A gate valve comprising a valve body having inlet and outlet ends with means at each of said ends for connecting the valve to flow conduits; a flowway between such ends; a chamber intersecting the flowway and opening to one side of the valve body; a bonnet sealably connected to the valve body and having a bore therethrough aligned with the chamber opening; a pair of annular spaced apart seats opposing each other and each having an opening therethrough coaxial with said flowway; a gate having parallel outwardly facing seating surfaces disposed between said seats at all times and reciprocal therebetween, said gate having an imperforate portion positionable between the seats and across the flowway to prevent flow therethrough when the gate is moved to valve closed position and also having a port therethrough to be brought into alignment with the seats and the flowway to permit flow therethrough when the gate is in valve open position; actuating means for moving the gate between said valve closing and open positions including a valve stem attached to the gate and extending through the bore of the bonnet to the exterior of the bonnet; seal means between the stem and bonnet permitting movement of the stem while preventing escape of fluids from the bonnet; means for moving the stem outwardly consisting of the stem having an inner end exposed to line pressure within the valve body and an outer end exposed to atmospheric pressure exteriorly of the valve body such that a differential pressure effectively acts on the cross-sectional area of the stem within the seal means to provide the sole force to urge the stem outwardly of the valve body; said actuating means including a heat fusible element located outwardly of said seal means and disposed between opposing shoulders on the bonnet and the stem to transmit force developed by said actuating means to reciprocate the gate between valve closed and valve open positions but upon melting, being displaced by the stem being moved outwardly by said differential pressure so that said differential pressure will act on the stem to move it outwardly a distance that said gate will be moved fully from one of its valve closed and valve open positions to the other of such positions, said fusible element having a length at least equal to the distance said stem must move outwardly said distance.

2. The valve of claim 1 wherein said fusible element is an annular cylinder disposed around said stem, said bonnet including a cap surrounding said fusible element, said cap and stem each having a shoulder abutting the ends of said fusible element and the cap having a port therethrough through which the material of the fusible element is extruded when melted.

3. A heat sensitive valve comprising a valve body having a flowway therethrough and means at each end of the flowway for connecting the valve to flow conduits; a bonnet connected to the valve body and having a bore therethrough communicating with said flowway; a pair of spaced apart seats in said body surrounding the flowway; a gate having outwardly facing parallel seating surfaces on either side thereof for simultaneous sliding contact with said seats respectively, said gate also having an imperforate portion positionable between the seats across the flowway to prevent flow therethrough when the gate is moved to valve closed position and also having a port therethrough to be brought into axial alignment with the seats and with the flowway to permit flow therethrough when the gate is in valve open position; a valve stem attached to the gate and extending through the bore of the bonnet to the exterior of the bonnet, said stem including a first internally threaded hollow portion and a second externally threaded portion mating with said first portion so that upon relative rotation of the first and second stem portions, the second portion is caused to reciprocate the gate between valve open and valve closed positions; seal means between the stem and bonnet permitting movement of the stem while preventing escape of fluids from the bonnet; means for moving the stem outwardly consisting of the stem having an inner end exposed to line pressure within the valve body and an outer end exposed to atmospheric pressure exteriorly of the valve body such that a differential pressure effectively acts on the crosssectional area of the stem within the seal means to provide the sole force to urge stem outwardly of the valve body; a heat fusible element connecting between the bonnet and said first stem portion to normally transmit forces developed during reciprocation of the gate between valve open and valve closed positions but upon melting, being displaced by the stem as the latter is moved outwardly by said differential pressure so that when said gate is in its one position as hereinafter defined said pressure differential will act on the stem to move it outwardly a sufficient distance that said gate will be moved fully from one of its valve closed and valve open positions to the other of such positions, said bonnet having a space therein around said first stem portion of sufficient magnitude such that, when said fusible element is melted, both the first and second stem portions are free to move outwardly said sufficient distance.

4. The valve of claim 3 wherein the nut portion has an outturned annular flange and the bonnet has an inturned annular flange and wherein said fusible element is an annular cylindrical element disposed between said flanges, the length of the fusible element between said flanges being at least as great as said sufficient distance.

5. A gate valve comprising a valve body having inlet and outlet ends with means at each of said ends for connecting the valve to flow conduits; a flowway between such ends; a chamber intersecting the flowway and opening to one side of the valve body; a bonnet sealably connected to the valve body and having a bore therethrough aligned with the chamber opening; a pair of annular spaced apart seat opposing each other and each having an opening therethrough coaxial with sid flowway; a gate having parallel outwardly facing seating surfaces disposed between said seats at all times and reciprocal therebetween, said gate having an imperforate portion positionable between the seats and across the flowway to prevent flow therethrough when the gate is moved to valve closed position and also having a port therethrough to be brought into alignment with the seats and the flowway to permit flow therethrough when the gate is in valve open position; actuating means for moving the gate between said valve closing and open positions including a valve stem attached to the gate and extending through the bore of the bonnet to the exterior of the bonnet; seal means between the stem and bonnet permitting movement of the stem while preventing escape of fluids from the bonnet; means for urging the stem outwardly of the valve body consisting of the stem having an inner end exposed to line pressure within the valve body and an outer end exposed to atmospheric pressure exteriorly of the valve body such that a differential pressure effectively acts on the crosssectional area of the stem within the seal means to provide the necessary force for urging the stem outwardly of the valve body; said actuating means including a first shoulder on the bonnet, a second shoulder opposing the first shoulder and connected to the stem so that said differential pressure urging the stem outwardly of the body also urges the second shoulder towards the first shoulder, a heat fusible element disposed between said first and second shoulder and normally preventing the second shoulder from moving toward the first shoulder during normal opening and closing of the valve but upon melting being displaced from between said first and second shoulders to allow the stem to be moved outwardly a predetermined distance to move the second shoulder toward the first shoulder and in so doing to move the gate fully from one of its valve open and closed positions to the other of said positions, said fusible element having a length at least equal to said predetermined distance.

6. The valve of claim 5 wherein said fusible element is an annular cylinder disposed around said stem, said bonnet including a cap surrounding and enclosing said fusible element to shield it from a fire, said cap and stem each having a shoulder abutting the ends of said fusible element and the cap having a port therethrough through which the material of the fusible element is extruded when melted.

7. A heat sensitive valve comprising a valve body having a flowway therethrough and means at each end of the flowway for connecting the valve to flow conduits; a bonnet connected to the valve body and having a bore therethrough communicating with said flowway; a pair of spaced apart seats in said body surrounding the flowway; a gate having outwardly facing parallel seating surfaces on either side thereof for simultaneous sliding contact with said seats respectively, said gate also having an imperforate portion positionable between the seats across the flowway to prevent flow therethrough when the gate is moved to valve closed position and also having a port therethrough to be brought into axial alignment with the seats and with the flowway to permit flow therethrough when the gate is in valve open position; a valve stem attached to the gate and extending through the bore of the bonnet to the exterior of the bonnet, said stem including a first internally threaded hollow portion having an outturned flange and a second externally threaded portion mating with said first portion so that upon relative rotation of the first and second stem portions, the second portion is caused to reciprocate the gate between valve open and valve closed positions; seal means between the stem and bonnet permitting movement of the stem while preventing escape of fluids from the bonnet; means for moving the stem outwardly consisting of the stem having an inner end exposed to line pressure within the valve body and an outer end exposed to atmospheric pressure exteriorly of the valve body such that a differential pressure effectively acts on the cross-sectional area of the stem within the seal means to provide the sole force to urge stem outwardly of the valve body; said bonnet having an inturned flange opposing said outturned flange and spaced therefrom a distance at least as great as that which the gate moves between is fully open and fully closed positions; a heat fusible element extending between said flanges to normally transmit forces developed during reciprocation of the gate between valve open and valve closed positions but upon melting, being displaced by the stem as the latter is moved outwardly by said differential pressure so that when said gate is in its one position as hereinafter defined, said pressure differential will act on the stem to move it outwardly a sufficient distance that said gate will be moved fully from one of its valve closed and valve open positions to the other of such positions.

8. A gate valve comprising a valve body having inlet and outlet ends with means at each of said ends for connecting the valve to flow conduits; a flowway between such ends; a chamber intersecting the flowway and opening to one side of the valve body; a bonnet sealably connected to the valve body and having a bore aligned with the chamber opening; a seat surrounding the flowway; a gate seatable on said seat to prevent flow through said flowway when the gate is moved to valve closed position and being movable from said seat to permit flow through said flowway when the gate is in valve open position; seal means between the stem and bonnet permitting movement of the stem while preventing escape of fluids from the bonnet; actuating means for moving the gate between said valve closed and open positions including a valve stem attached to the gate and extending through the bore of the bonnet to the exterior of the bonnet and having an outturned shoulder thereon; said bonnet having an inturned shoulder normally spaced from and opposing the outturned shoulder, said shoulders being located outwardly of said seal means; a heat fusible element located between and abutting said shoulders and holding them apart during normal operation of the valve and transmitting forces between said shoulders as such forces are developed by said actuating means to reciprocate the gate between valve closed and valve open positions but upon melting permitting said outturned shoulder to be moved toward said inturned shoulder to permit the stem to move outwardly and thereby move the gate from one of its valve open and closed positions to the other of said positions; the length of said element and hence the normal spacing of said shoulders being at least equal to the distance the valve stem must move the gate outwardly as aforesaid.

* * * * *

UNITED STATES PATENT AND TRADEMARK OFFICE
CERTIFICATE OF CORRECTION

PATENT NO. : 4,421,134
DATED : December 20, 1983
INVENTOR(S) : Billy Ray Bruton and David E. Snyder It is certified that error appears in the above—identified patent and that said Letters Patent is hereby corrected as shown below:

Column 1, line 3, insert--This is a continuation-in-part of application serial number 171,372, filed July 23, 1980, now abandoned.--.

Signed and Sealed this

Thirteenth Day of November 1984

[SEAL]

Attest:

Attesting Officer

GERALD J. MOSSINGHOFF

Commissioner of Patents and Trademarks